(12) United States Patent
Ryan

(10) Patent No.: US 8,385,220 B2
(45) Date of Patent: Feb. 26, 2013

(54) SYSTEMS AND METHODS FOR DETERMINING TIME VARYING RADIO FREQUENCY ISOLATION CHARACTERISTICS BETWEEN NETWORK CELLS

(75) Inventor: David J. Ryan, Seattle, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 234 days.

(21) Appl. No.: 12/708,512

(22) Filed: Feb. 18, 2010

(65) Prior Publication Data

US 2010/0214939 A1    Aug. 26, 2010

Related U.S. Application Data

(60) Provisional application No. 61/155,035, filed on Feb. 24, 2009.

(51) Int. Cl.
*H04Q 7/24* (2006.01)
(52) U.S. Cl. .......................................... 370/252; 370/338
(58) Field of Classification Search .................. 370/252, 370/253, 328–338, 468; 455/450–453
See application file for complete search history.

(56) References Cited

U.S. PATENT DOCUMENTS

| | | | | |
|---|---|---|---|---|
| 6,104,933 | A * | 8/2000 | Frodigh et al. | ................. 455/522 |
| 2006/0058033 | A1 | 3/2006 | Marsan et al. | |
| 2007/0010203 | A1 | 1/2007 | Wee et al. | |
| 2007/0060179 | A1 | 3/2007 | Yamauchi et al. | |
| 2007/0105559 | A1 | 5/2007 | Dillon et al. | |
| 2009/0270109 | A1 * | 10/2009 | Wang Helmersson et al. | ............................ 455/453 |

FOREIGN PATENT DOCUMENTS

| | | |
|---|---|---|
| JP | 2008-306467 A | 12/2008 |
| KR | 1020080037150 A | 4/2008 |

OTHER PUBLICATIONS

International Search Report and Written Opinion for PCT/US2010/024629 filed on Feb. 18, 2010.

* cited by examiner

*Primary Examiner* — Pao Sinkantarakorn

(57) ABSTRACT

A networked computing system including multiple network base stations, user equipment, and a data communications network facilitating communications amongst all devices of the networked computing system. The radio frequency isolation between two network base stations is determined by taking measurements of a radio operating parameter associated with at least one interference source. A regional network device located near one of the two base stations is configured measures the radio operating parameter on a periodic basis and then transfers the measurements to a radio communications controller. The radio communications controller then allocates network communications resources to user equipment, and optionally designates radio operation levels for one or more network base stations, based on a comparison of the received measurements to known broadcast levels of the radio operating parameter.

13 Claims, 8 Drawing Sheets

SYSTEMS AND METHODS FOR DETERMINING TIME VARYING RADIO FREQUENCY ISOLATION CHARACTERISTICS BETWEEN NETWORK CELLS

CROSS REFERENCE TO RELATED APPLICATIONS

The present application claims the benefit of U.S. Provisional Application No. 61/155,035, filed Feb. 24, 2009.

FIELD OF THE INVENTION

The field of the present invention generally relates to measuring radio frequency isolation between and amongst neighboring radio access nodes in a distributed wireless communications network. More specifically, the invention relates to utilizing real-time channel measurements, taken by existing networked resources, to accurately account for difficult-to-model dynamic and static contributors to neighbor cell isolation in radio frequency isolation determinations.

BACKGROUND OF THE INVENTION

Modern wireless communications networks include many different network topologies comprising heterogeneous mixtures of macrocell, microcell, picocell, and femtocell resources. At the highest level of wireless coverage, a macrocell provides cellular service for a relatively large physical area, often in areas where network traffic densities are low. In more dense traffic areas, a macrocell may act as an overarching service provider, primarily responsible for providing continuity for service area gaps between smaller network cells. In areas of increased traffic density, microcells are often utilized to add network capacity and to improve signal quality for smaller physical areas where increased bandwidth is required. Numerous picocells and femtocells generally add to network capacity for even smaller physical areas in highly populated metropolitan and residential regions of a larger data communications network.

As would be understood by those skilled in the Art, in all wireless service provider networks, macrocells typically provide the largest wireless coverage area for licensed frequency spectra, followed by microcells, then picocells, and lastly femtocells. By way of example, in a typical wireless data communications network, a macrocell base station may provide a wireless coverage area ranging between one to five kilometers, radially from the center of the cell; a microcell base station may provide a coverage area ranging between one-half to one kilometer radially; a picocell base station may provide a coverage area ranging between 100 to 500 meters radially; and a femtocell base station may provide a coverage area of less than 100 meters radially. Each of these network cell or base station types is generally configured to connect with a particular service provider network using various common wireline communications technologies, including, but not limited to: fiber optic, twisted pair, powerline, and/or coaxial cable (joining cells to a backhaul network).

Macrocell and microcell network deployments are typically designed and orchestrated by radio communications engineers and scientists whom model idealized radio propagation (including various path loss considerations) and frequency planning scenarios during a network planning phase, in order to provide optimal cell provisioning for various network resources. Computer modeling is often employed to determine frequency spectrum allocation for network cells, including frequency reuse assignment, and radio operation level (e.g., power levels and/or modulation and coding schemes) assignments for various network base stations.

These modeling operations often attempt to simulate radio frequency isolation contributors by using a variety of theoretical path loss models. These idealized models require relatively conservative estimates of inter-access node isolation in order to minimize the possibility of co-channel interference (CCI) between neighboring base stations in a wireless network. These digital tools fail to accurately predict/forecast challenging radio frequency propagation environments (e.g., most real world metropolitan environments) including interference between overarching macrocells and structurally contained picocells and/or femtocells (e.g., cells contained within office buildings or residential housing). These modern planning utilities are also deficient (by being overly conservative) in accurately estimating time-varying radio frequency isolation contributors, such as changing seasonal foliage, time-varying regional vehicular traffic patterns, radio access node power control in response to access node utilization, etc.

In order to reduce the possibility of CCI amongst network cells re-using the same frequency spectra, conservative network planning and resource optimization processes often result in unnecessarily reduced radio operation levels at network base stations. These overly limited resource operations can unduly waste network capacity by improperly constraining network resource utilization. As would be understood by those skilled in the Art, co-channel interference or CCI generally refers to interference caused by multiple network base stations operating on the same frequency within a region of a wireless communications network. In many cellular communications networks (e.g., in LTE, GSM, and UMTS networks), frequency spectrum is a scarce resource that is divided into non-overlapping spectrum bands that may be assigned to different network cells in accordance with specific frequency planning methodologies. Generally, frequency planning limitations require frequency channels to be re-used, such that the same frequency spectrum bands or channels are re-assigned amongst neighboring network cells in a specific order. In scenarios with significant CCI, users located at the periphery of interfering cells often experience diminished service capacity, dropped communications, and frequent handoffs.

In many existing cellular networks, service providers utilize mobile network resource testing vehicles to periodically gather information to help them manually compensate for the effects of real-world radio frequency isolation contributors and neighboring interference sources. Unfortunately, these mobile testing solutions require manual operation as well as manual radio operating parameter adjustment at network resource sites. These solutions are also expensive to routinely employ, and they are too infrequently utilized to keep up with dynamically changing radio isolation and interference sources. Accordingly, existing theoretical modeling and manual testing/compensation techniques are inadequate solutions for effectively determining and neutralizing many of the negative effects associated with dynamically changing network environments, which are becoming more and more complex with the rapid deployment of an increasing numbers of smaller network cells in evolving wireless communications networks (e.g., with the evolution of 4G communications networks).

These new deployment topologies may result in robust mixtures of network cell coverages within regions of overlapping wireless service. In particular, many modern, low power base stations (e.g., picocell and femtocell devices base stations) are readily transportable within an existing communications network by end users. This mobility can create a situation where many smaller cell base stations may be moved to unpredictable locations within a network where their operation could potentially produce substantial interference to surrounding network infrastructure, unless their maximum radio power levels were constrained to reduce unwanted instances of network interference. These ad-hoc cell deployments are difficult to model, because end users often do not register their devices' new locations with their local service providers. As a result, modern mobile network resource optimization solutions are not utilized frequently enough to timely learn of their presence and then compensate for their interfering affect within a particular network cell.

Further, limited samplings of difficult-to-estimate neighbor cell isolation information made by mobile solutions may be improperly utilized to determine dynamic regional radio resource allocations (e.g., such as time-varying allocation of common radio bearer channels between neighboring cells). When local or temporal neighbor cell isolation is accurately determined to be sufficient, radio channels may be reused between cells even when they are geographically close to one another (e.g., in a scenario where smaller cells are structurally contained within a high path loss environment such as a brick building). Similarly, accurate radio isolation determinations can also be used in advanced local optimization algorithms such as automated common channel power control routines that adjust local base station transmit power with the goal of optimizing local coverage, while minimizing interference to neighboring cells. Unfortunately, modern computer path loss modeling techniques are inaccurate and unreliable, and most mobile testing solutions provide inadequate samplings of dynamically changing isolation environments to be efficiently utilized in modern network resource planning and optimization.

Accordingly, it would be helpful to be able to adequately compensate for radio channel isolation contributors that are both time-varying as well as static in nature, because these isolation contributors are often very difficult to accurately estimate/determine using modern computer modeling and mobile testing techniques. It would further be advantageous to have improved systems and methods that could account for radio frequency isolation sources that change over the course of a single day (e.g., hourly traffic patterns) in the line of sight path between neighboring network cells. It would be helpful to be able to utilize existing network resources (e.g., distributed user equipment and neighboring base stations) to account for actual network resource operating conditions, in order to facilitate accurate determinations of network radio frequency isolation characteristics between and amongst various network base stations. It would further be advantageous if these improved solutions enhanced radio access network performance by employing optimized channel assignment algorithms to effectively manage radio resources based on ongoing automated measurements of changing isolation and interference sources in a dynamic network environment. These improved, self-optimizing network utilities would effectively automate processes that were previously largely manual tasks, thereby reducing the level of required human intervention for successful network operations. This would result in operational and/or deployment savings and it would provide for many other performance, quality, and operational benefits. The importance of these benefits would be readily understood by those familiar with the multitude of benefits commonly associated with self-organized network solutions.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with modern systems and methods that model radio frequency isolation between neighboring network base stations, the present invention discloses networked computing systems and methods facilitating real-time measurement of radio frequency isolation between network resources. In an embodiment, the networked computing system may include multiple network base stations, one or more user equipment, and a data communications network facilitating data communications amongst all communicating devices of the networked computing system. The radio frequency isolation between a first network base station and a second network base station may be determined by taking measurements of a radio operating parameter associated with one or more neighboring interference sources.

In accordance with another aspect of the present invention, a regional network device located near the first network base station or the second network base station may be configured to measure the radio operating parameter on a periodic basis.

In accordance with a further aspect of the present invention, the regional network device may be either a network base station or a user equipment of the data communications network.

In accordance with another aspect of the present invention, the regional network device may also be configured to transfer measurements of the radio operating parameter taken at different operating times to a radio communications controller.

In accordance with yet another aspect of the present invention, the radio communications controller may be configured to allocate network communications resources to one or more user equipment or to designate radio operation levels for one or more network base station, based on a comparison of the received measurements of the radio operating parameter to known broadcast levels of the radio operating parameter.

In accordance with a further aspect of the invention, the radio frequency isolation between the first network base station and the second network base station may be affected by a time-varying isolation sources, including: vehicular traffic patterns, seasonal environmental isolation sources, predictable adverse atmospheric conditions, or radio access node power control in response to network load patterns.

In accordance with yet a further aspect of the invention, the radio operating parameter measurements may be affected by time-varying and/or static isolation sources that are geographically positioned between the first network base station and the second network base station within the data communications network.

In accordance with another aspect of the present invention, is a computer-readable medium encoded with computer-executable instructions for determining time-varying radio isolation characteristics associated with wireless network resources, which when executed, performs a method including: measuring a radio operating parameter that is associated with at least one interference source within a data communications network, and then determining a radio frequency isolation between a first network base station and a second network base station of the data communications network, based on the measurements of the radio operating parameter.

In accordance with a further aspect of the present invention, is a computer-implemented method for determining time-varying radio isolation characteristics associated with wireless network resources, the method including: measuring a radio operating parameter that is associated with at least one interference source within a data communications network, and then determining a radio frequency isolation between a first network base station and a second network base station of the data communications network, based on the measurements of the radio operating parameter.

BRIEF DESCRIPTION OF THE DRAWINGS

Preferred and alternative examples of the present invention are described in detail below with reference to the following Figure drawings.

DETAILED DESCRIPTION

Figure 1:
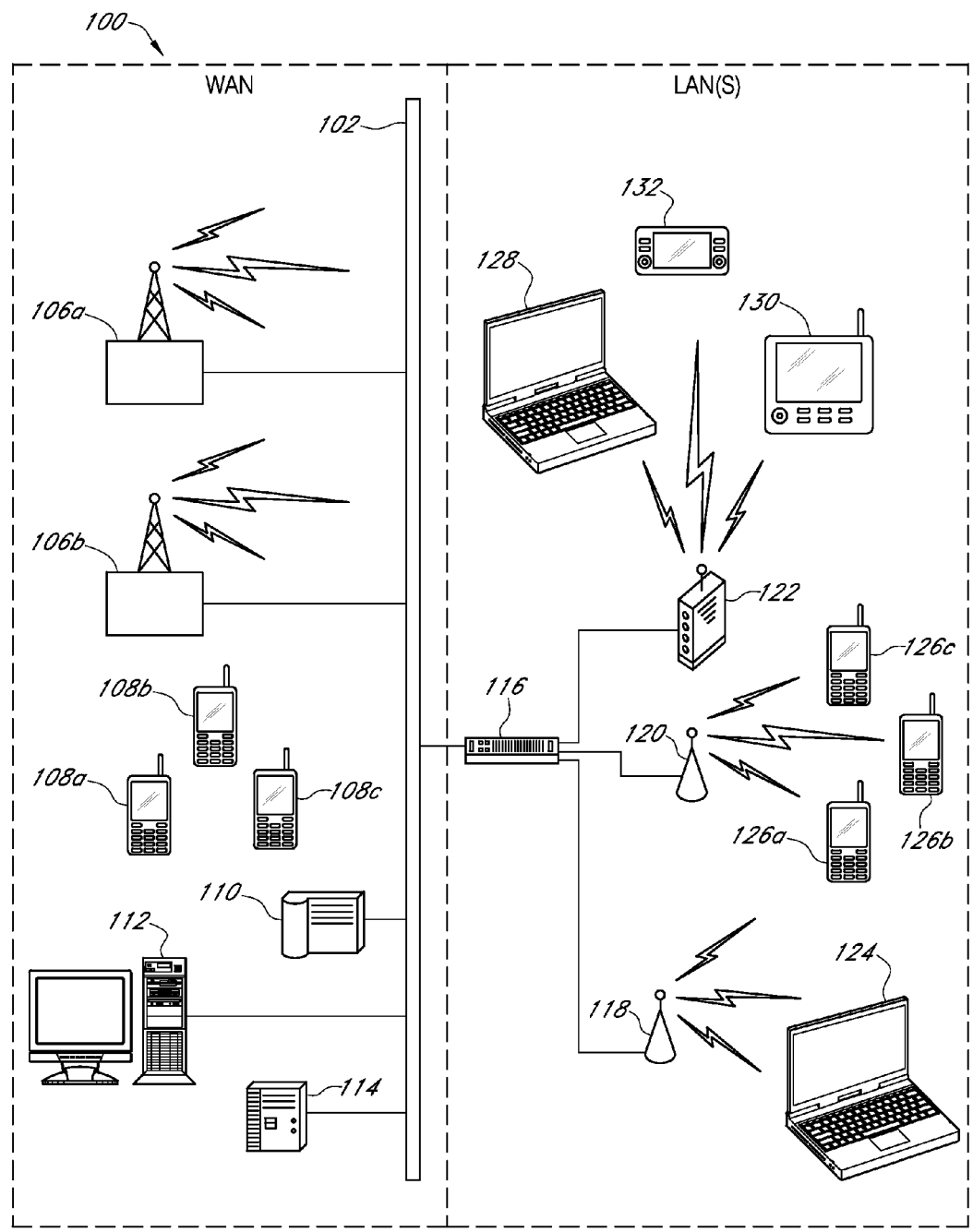
FIG. 1 illustrates a perspective view of a distributed data communications network in accordance with an embodiment of the present invention.

In accordance with an exemplary embodiment of the present invention, FIG. 1 illustrates a networked computing system 100 including various wireline and wireless computing devices that may be utilized to implement any of the radio channel isolation determination and network resource allocation processes associated with various embodiments of the present invention. The networked computing system 100 may include, but is not limited to, a group of service provider controller devices 110, 112, and 114; remote base stations 106a-b that may be associated with larger cells (e.g., macrocells and/or microcells) and may be overarching and/or neighboring base stations to any of the other local base stations 118, 120, and 122 within a particular region of the networked computing system 100; multiple remote user equipment 108a-c (e.g., optionally including cell phones, PDAs, net books, electronic book devices, etc.) that may be provided service by any of the remote base stations 106a-b; a data communications network 102, including both Wide Area Network (WAN) and Local Area Network (LAN) portions; one or more network gateways, routers, or switch devices 116 that can facilitate data communications processes within the LAN and between the LAN and the WAN of the data communications network 102; local base stations 118, 120, and 122 that may be associated with smaller cells (e.g., picocells and femtocells), that can provide wireless service to any number or type of local user equipment 124, 126a-c, 128, 130, and 132; and a variety of local wireless user equipment, including: a net book computer 124, a variety of cellular phone and/or PDA devices 126a-c, a laptop computer 128, an electronic book device 130, a handheld gaming unit 132, along with any other common portable wireless computing device well known in the art (e.g., personal music players, video recorders, tablets computers, etc.) that are capable of communicating with the data communications network 102 utilizing wireless services provided by one or more of the remote or local base stations 106a-b, 118, 120, and 122, or any other common wireless or wireline network communications technology.

In an embodiment, any of the service provider controller devices 110, 112, and 114, and network base stations 106a-b, 118, 120, and 122 may function, independently or collaboratively, to control/manage any of the radio channel isolation determination and network resource allocation processes associated with various embodiments of the present invention. Further, any of the radio channel isolation determination and network resource allocation processes may be carried out by any common communications technologies known in the Art, such as those technologies common to modern Global Systems for Mobile (GSM), Universal Mobile Telecommunications System (UMTS), and Long Term Evolution (LTE) network infrastructure. In accordance with a standard GSM network, any of the service provider controller devices 110, 112, and 114 may be associated with a base station controller (BSC), a mobile switching center (MSC), or any other common service provider control device known in the art, such as a radio resource manager (RRM). In accordance with a standard UMTS network, any of the service provider controller devices 110, 112, and 114 may be associated with a radio network controller (RNC), a serving GPRS support node (SGSN), or any other common service provider controller device known in the art, such as a radio resource manager (RRM). In accordance with a standard LTE network, any of the service provider controller devices 110, 112, and 114 may be associated with an eNodeB base station, a mobility management entity (MME), or any other common service provider controller device known in the art, such as a radio resource manager (RRM).

In an embodiment, any of the service provider controller devices 110, 112, and 114, the network base stations 106a-b 118, 120, and 122, as well as any of the user equipment 108a-c, 124, 126a-c, 128, 130, and 132, may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the service provider controller devices 110, 112, and 114, or any of the remote base stations 106a-b may employ any number of common server, desktop, laptop, and personal computing devices.

In an embodiment, any of the user equipment 108a-c, 124, 126a-c, 128, 130, and 132, may include any combination of common mobile computing devices (e.g., laptop computers, net book computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions (e.g., the backhaul or local portions) of the data communications network 102 of FIG. 1 may employ any of the following common communications technologies: optical fiber, coaxial cable, twisted pair cable, Ethernet cable, and powerline cable, along with any wireless communication technology known in the art. In an embodiment, any of the service provider controller devices 110, 112, and 114, the network base stations 106a-b, 118, 120, and 122, or user equipment (108a-c, 124, 126a-c, 128, 130, and 132), may include any standard computing software and hardware necessary for processing, storing, and communicating data amongst each other within the networked computing system 100. The computing hardware realized by any of the network computing system 100 devices (106a-b, 108a-c, 110, 112, 114, 116, 118, 120, 122, 124, 126a-c, 128, 130, or 132) may include, but is not limited to: one or more processors, volatile and non-volatile memories, user interfaces, transcoders, modems, wireline and/or wireless communications transceivers, etc.

Further, any of the networked computing system 100 devices (106a-b, 108a-c, 110, 112, 114, 116, 118, 120, 122, 124, 126a-c, 128, 130, or 132) may be configured to include one or more computer-readable media (e.g., any common volatile or non-volatile memory type) encoded with a set of computer readable instructions, which when executed, performs a portion of any the radio channel isolation determination and network resource allocation processes associated with various embodiments of the present invention.

In context with various embodiments of the present invention, it should be understood that wireless communications coverage associated with various data communication technologies and cell types typically vary amongst different service provider networks based on the type of network and the system infrastructure deployed within a particular region of a network (e.g., differences amongst GSM, UMTS, and LTE networks and the resources deployed in each network type). As would be understood by those skilled in the Art, within all wireless networks, macrocells typically provide the largest wireless coverage area for licensed frequency spectra, followed by microcells, then picocells, and lastly femtocells. Determining whether a cell is considered a larger cell or a smaller cell is primarily based on a reference cell to which the cell in question in being compared. For example, a microcell may be considered to be a smaller cell compared to a macrocell and a larger cell compared to both a picocell and a femtocell. Likewise, a picocell may be considered to be a smaller cell compared to both a macrocell or a microcell and a larger cell compared to a femtocell. Further, one picocell may be considered to be a larger cell than another picocell, based on coverage area comparison between the two picocells and the technologies employed at the cells. In general, when comparing dissimilar cell types, a macrocell is always considered to be a larger cell, and a femtocell is always considered to be a smaller cell.

Figure 2:
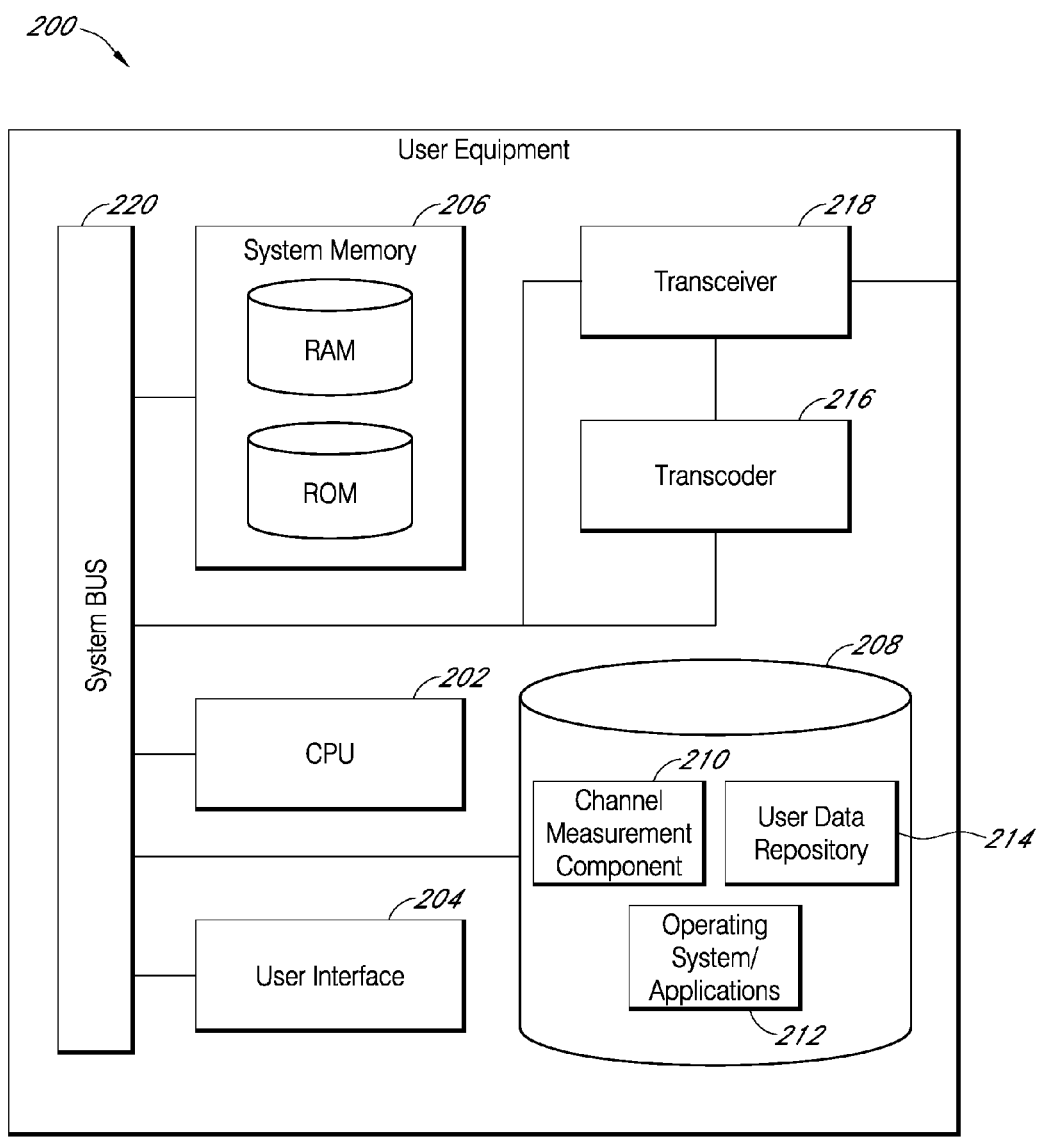
FIG. 2 illustrates a block diagram of a user equipment in accordance with an embodiment of the present invention.

FIG. 2 illustrates a block diagram view of a user equipment 200 that may be representative of any of the user equipment 108a-c, 124, 126a-c, 128, 130, and 132 depicted in FIG. 1. In accordance with an embodiment of the present invention, user equipment 200 may include, but is not limited to, one or more data processing devices including a central processing unit (CPU) 202. In an embodiment, the CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 may be responsible for executing all computer programs stored on user equipment's 200 volatile (RAM) and nonvolatile (ROM) system memories, 206 and 208.

The user equipment 200 may also include, but is not limited to, a user interface 204 that can facilitate a user interacting with the user equipment's 200 local hardware and software resources, a software/database repository 208 including: a channel measurement component 210, a repository storing the user equipment's operating system as well as any number or local applications 212, and a repository storing various user data related to personal information and data content 214; a transcoder 216 for formatting or reformatting incoming and outgoing data communications; a wireless transceiver component 218 for transmitting and receiving network communications to and from various network resources, including any of the service provider controller devices 110, 112, and 114, the network base stations 106a-b, 118, 120, and 122, or other network user equipment (108a-c, 124, 126a-c, 128, 130, and 132); and a system bus 220 that facilitates data communications amongst all the hardware resources of the user equipment 200.

In accordance with an embodiment of the present invention, the channel measurement component 210 may be configured to measure downlink radio operating level parameters associated with radio transmit power levels and/or MCS levels of various network base station channels. The measurement component 210 may also include geographical positioning determination (e.g., facilitated by a resident GPS unit (not shown) that may be a part of the wireless transceiver component 218), to provide additional mapping resolution and to provide valuable information related to an area of actual cell coverage and a degree of neighbor cell overlap across the service sectors of a particular network base station.

Figure 3:
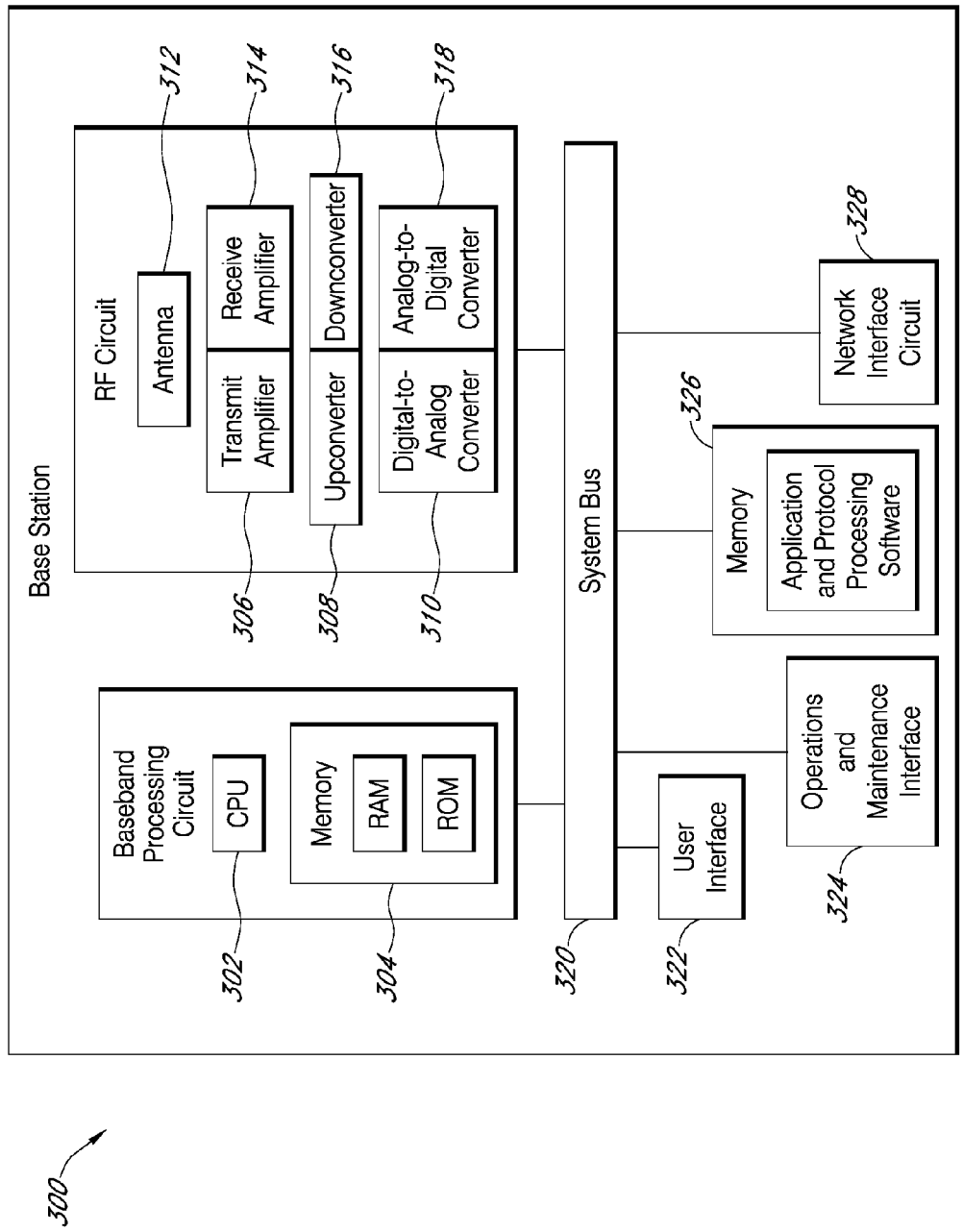
FIG. 3 illustrates a block diagram of a network base station in accordance with an embodiment of the present invention.

FIG. 3 illustrates a block diagram view of a network base station 300 (e.g., a macrocell, a microcell, a picocell, or a femtocell base station) that may be representative of any of the local or remote network base stations 106a-b, 118, 120, and 122 of FIG. 1. In accordance with an embodiment of the present invention, the network base station 300 may include, but is not limited to, a baseband processing circuit including a central processing unit (CPU) 302. In an embodiment, the CPU 302 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 302 is responsible for executing all computer programs stored on the network base station's 300 volatile (RAM) and nonvolatile (ROM) system memories, 304 and 326.

The network base station 300 may also include, but is not limited to, a radio frequency (RF) circuit for transmitting and receiving data to and from the network. The RF circuit may include, but is not limited to, a transmit path including a digital-to-analog converter 310 for converting digital signals from the system bus 320 into analog signals to be transmitted, an upconverter 308 for setting the frequency of the analog signal, and a transmit amplifier 306 for amplifying analog signals to be sent to the antenna 312. The RF circuit may also include, but is not limited to, a receive path including the receive amplifier 314 for amplifying the signals received by the antenna 312, a downconverter 316 for reducing the frequency of the received signals, and an analog-to-digital converter 318 for outputting the received signals onto the system bus 320. The system bus 320 facilitates data communication amongst all the hardware resources of the base station device 300. The network base station 300 may also include, but is not limited, to a user interface 322, an operations and maintenance interface 324, a memory 326 storing application and protocol processing software, and a network interface circuit 328 facilitating communication across the LAN and/or WAN portions of the data communications network 102 (e.g., a backhaul network).

In an embodiment, the RF circuit receive path 312, 314, 316 and 318 of the network base station 300 may be adapted (in combination with the a measurement utility (not shown) of the application and protocol processing software of the memory 326) to measure downlink radio operating level parameters associated with radio transmit power levels and/or MCS levels of various neighboring network base stations. The network base station acting in a measurement mode may be thought of as a "sniffer" base station receiving downlink communications from one or more neighboring cells. Generally, the network base station 300 will be aware of its own geographical position, but it may also include geographical determination functionality (e.g., in scenarios where the base station is smaller cell device such as a picocell or a femtocell) facilitated by a resident GPS unit (not shown) to provide additional mapping resolution and to provide valuable information related to an area of actual cell coverage and a degree of neighbor cell overlap across the service sectors of a particular network base station being measured.

In an embodiment, the invention may employ one or more network base stations 300 as well as one or more regional user equipment 200 to measure local communication operating parameters associated with particular network base stations' communications, in order to determined radio frequency isolation between network cells. In an embodiment, a controlling network base station may use either local downlink receivers/sniffers or locally served user equipment to make received radio operating parameter measurements of neighboring base station communications. These measurements can be made on any uniquely identifiable communications channel such as a coded broadcast channel, a synchronization channel, or a transient bearer channel that may be periodically energized to support such measurement functionality.

In an embodiment where one or more neighboring network base station 300 is equipped with a downlink receiver/sniffer as part of its receive path 312, 314, 316, and 318, neighboring cell received energy measurements could be performed while muting the base station's 300 transmit path 310, 308, 306, and 312 of the RF circuit. In this embodiment, the network base station 300 may be momentarily taken out of service, such that neighboring base station isolation measurements could be substantially performed during scheduled idle times. In most practical scenarios, these idle times could be scheduled during times of reduced network capacity or during known low traffic periods that often occur late at night.

In an embodiment, received neighbor cell radio operating parameters (e.g., radio power levels) may be obtained by a network base station 300, querying local user equipment 200 to make communications measurements using their respective channel measurement components 210. In an embodiment, these user equipment measurements could be performed during off peak operating hours or during times when neighbor cell channel resources are generally available (e.g., as determined by querying the neighbor cell over peer to peer links such as an X2 neighbor cell communication link defined in the 3GPP LTE standard).

The base station and/or controller device (e.g., any of the network base stations 106a-b 118, 120, and 122, or any of the service provider controller devices 110, 112, and 114 of FIG.

1) initiating the isolation determination, may issue an isolation measurement request to a neighbor base station of interest, thereby directing the neighbor base station to initiate a transient transmission specifically for the purpose of a downlink receiving device (e.g., a sniffer at a base station 300) making such measurements. The initiating base station and/or controller device may also direct served user equipment (e.g., user equipment 200) to monitor specific radio bearer channels to make a downlink energy measurements and then report the results of the measurements back to the initiating base station. Alternatively, the initiating cell may query a neighbor cell for an active bearer channel and a mean power controlled energy in a particular channel of interest. Locally served user equipment may then be instructed to perform a measurement of received energy on the bearer channel of interest and subsequently report the measurement results back to the controlling cell.

In an embodiment, network base stations (e.g., network base stations 106a-b, 118, and 120 of FIG. 1) may also determine transmit power in a monitored channel of interest.

The specific network resources utilized to achieve this effect, largely depends on the channel type being assessed. In an embodiment, the transmitted channel power may be determined via a local node-to-node communications link (e.g., an X2 link defined for 3GPP LTE networks) and a message content such as transmit power that is declared on broadcast channels or included as a message payload in transient bearer channels energized for periodic isolation measurements.

In an embodiment, the present invention may lead to increased network performance and network resource utilization by using ongoing, real-time measurements made in the actual radio frequency propagation environment to generate local isolation tables for various network base stations. The values in these continually updating tables may then be used by network performance monitoring tools and/or self optimization and dynamic channel assignment algorithms to efficiently manage radio resources, based on changing regional network conditions.

In an embodiment, each network base station may compile and maintain table listings based on downlink receiver and/or user equipment measurements of at least the following radio operating parameters: a transmitted energy in channel of interest, a received energy in a channel of interest, and inter-access-node isolation, defined as the ratio (linear power terms) or difference (logarithmic notation in dB) of transmitted vs. received power in a measurement channel of interest. This listing may be time-averaged appropriately to reduce short term channel fading effects but still be maintained in a pseudo-real-time manner sufficient to be used as an input to various radio resource management tools, such as dynamic channel allocation (DCA) algorithms, or to aid in choice of optimal modulation modes or power settings. As would be understood by those skilled in the art, DCA is an automatic process for assigning traffic channels in a frequency reuse wireless system. In DCA, a base station may continuously monitor the interference in all idle channels and then make service assignments by using a cell selection algorithm that determines the channel that will produce the least amount of additional interference.

Figure 4:
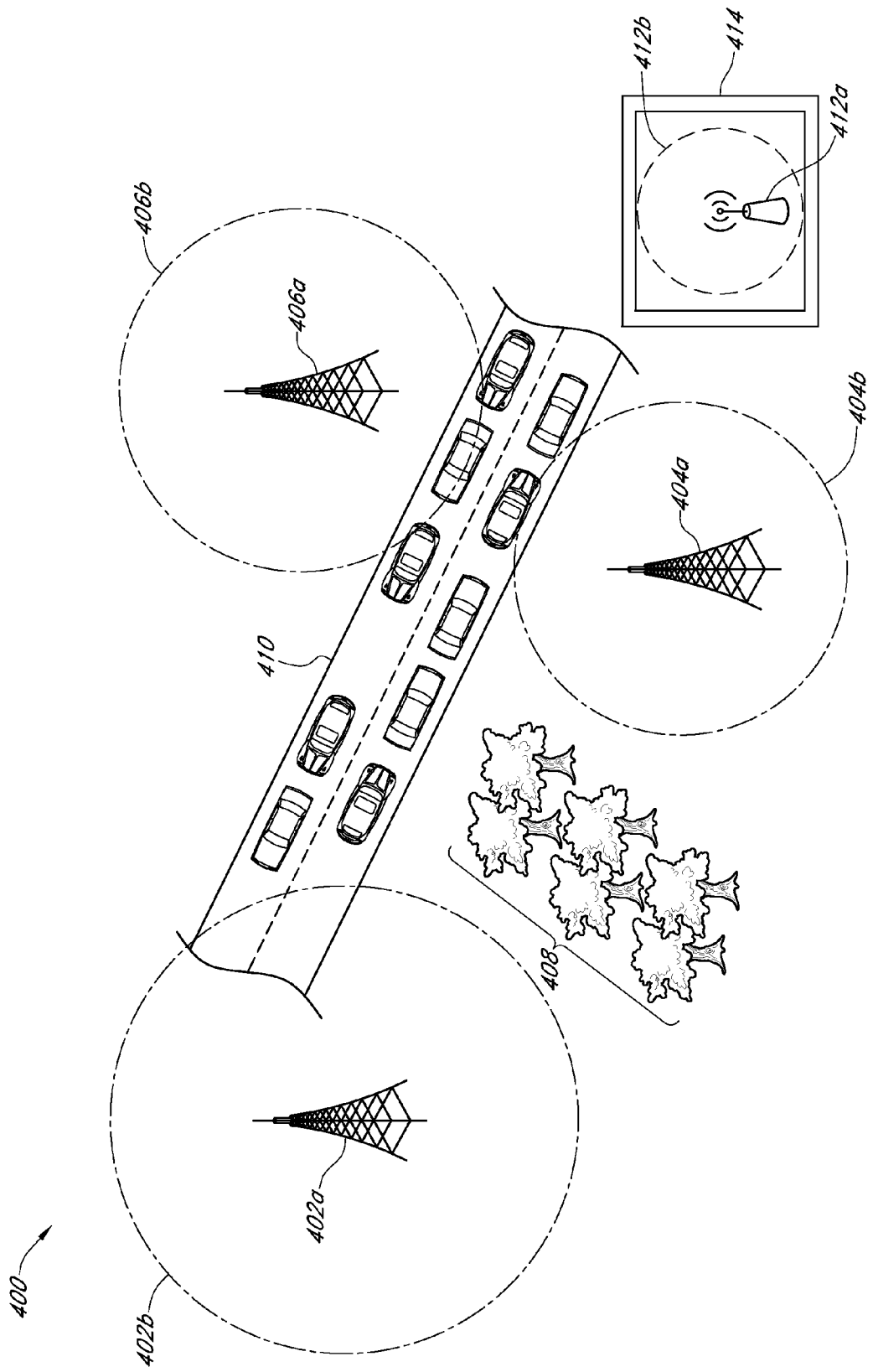
FIG. 4 illustrates a network topology comprising various neighboring base stations having time-varying and static isolation sources geographically positioned between pairs of base stations, in accordance with an embodiment of the present invention.

FIG. 4 illustrates a network topology 400 comprising various neighboring base stations having time-varying and static isolation sources geographically positioned between pairs of network base stations, in accordance with an embodiment of the present invention. The network topology 400, includes multiple network base stations 402a, 404a, 406a, and 412a that may be representative of various macrocell, microcell, picocell, or femtocell base stations. These base stations 402a,

404a, 406a, and 412a may respectively have various cell coverage areas 402b, 404b, 406b, and 412b that can be selectively increased or decreased based on determining and adjusting for various radio channel isolation sources associated with environmental isolation contributors, such as regional traffic patterns 410, seasonal foliage changes 408, construction material effects caused by placing network base stations 412a inside of office buildings or subscriber residences, etc. These isolation contributors 408, 410, and 414 may consist of any combination of dynamic/time-varying and static radio isolation sources located between neighbor cells, which are typically difficult to estimate using computer modeling techniques or accurately measure using mobile vehicle testing solutions.

Over the course of a give day the dynamic radio frequency isolation between network base station 404a and network base station 406a would be expected to change based on vehicular traffic patterns 410 in the line of sight path between the neighboring cells. Similarly, the dynamic radio channel isolation between network base station 404a and network base station 402a would be expected to change over the course of months and even years, due to seasonal foliage changes of organic isolation contributors 408. Static channel isolation between network base station 404a and network base station 412a would be relatively stable, but likely much higher than that predicted by typical large scale propagation path loss modeling tools due to unpredictable indoor to outdoor building penetration losses.

In an embodiment, each network base station may maintain separate radio isolation tables comprising a listing of radio channel isolation characteristics/metrics associated with all neighboring base stations. For example, network base station 404a may maintain a listing of radio isolation characteristics between itself and each of network base stations 402a, 406a, and 412a. In an embodiment this listing may include isolations determined by taking the difference between the known transmit radio power of a particular network base station 404a and a received radio power (e.g., as seen by a sniffer or a user equipment) at a location near a second network base station (e.g., any of base stations 402a, 406a, or 412a), having one or more dynamic and static isolation sources positioned therebetween.

In scenarios where local or temporal neighbor cell isolation (isolation between any of network base stations 402a, 404a, 406a, and 412a) can be accurately determined, channels may be reused between cells even though they are geographically close to one another (channel reuse between cells 402a and 412a). Similarly, radio isolation measurements may be used in advanced local optimization algorithms such as automated common channel power control routines that adjust local access node transmit power with the goal of optimizing local coverage while minimizing interference between neighboring cells. Locally obtained, time-varying measurements of actual radio channel isolation between network base stations is essential to facilitate real-time optimization of shared radio resources.

Figure 5:
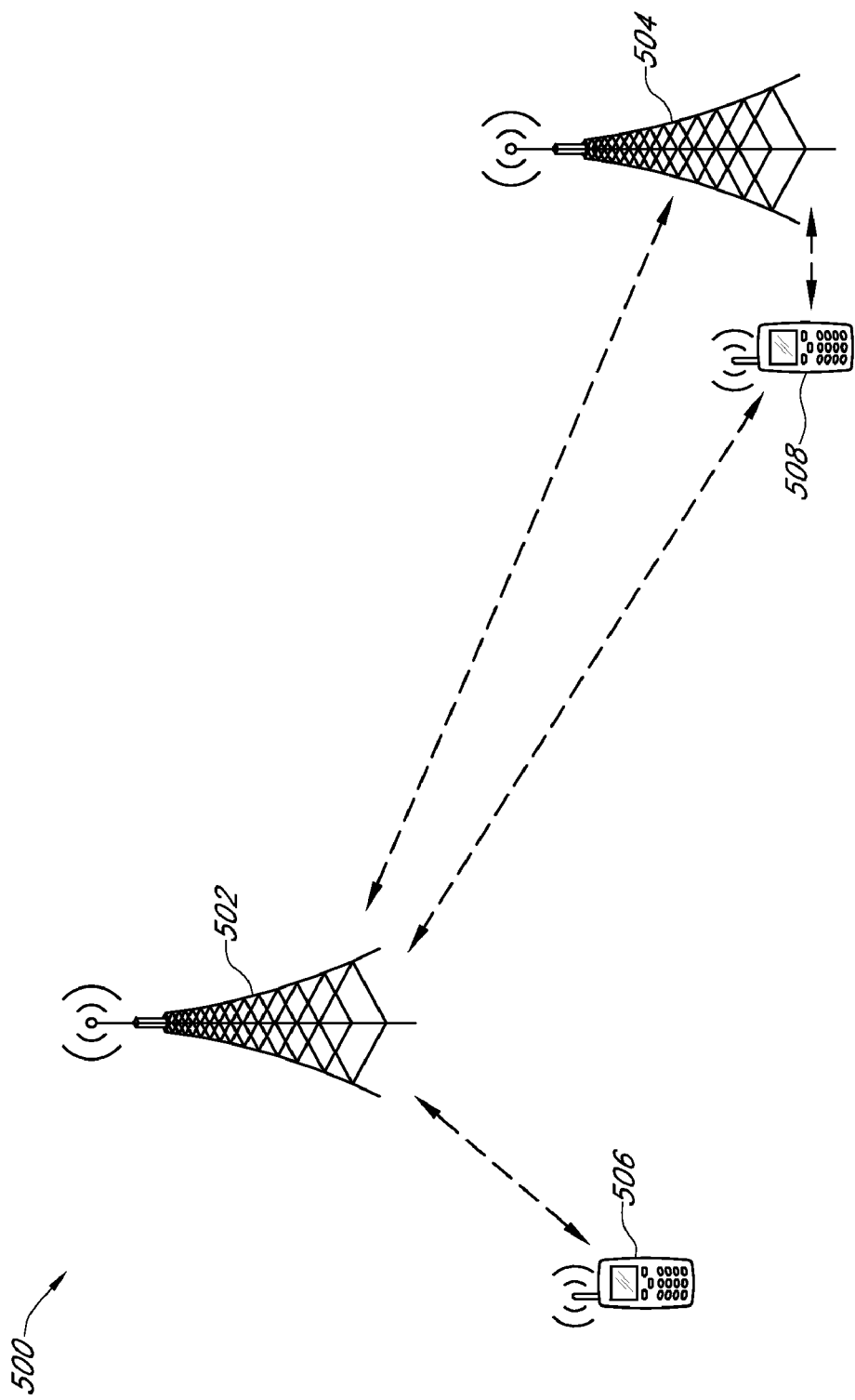
FIG. 5 illustrates a network topology including multiple base stations and multiple user equipment, where the user equipment are utilized to perform network channel measurements, in accordance with an embodiment of the present invention.

FIG. 5 illustrates a network topology 500 including multiple base stations 502 and 504 as well as multiple user equipment 506 and 508, where the user equipment may be utilized to perform network channel measurements, in accordance with an embodiment of the present invention. Network topology 500 demonstrates system configured to query served user equipment 506 and 508 to perform received energy measurements of radio bearer and/or common channels from nearby network base stations 502 and 504. In an embodiment, the locally served user equipment 508 is utilized by base station 504 in combination with information obtained by peer to peer neighbor cell communications over a suitable communications channel. In this scenario, base station 504 may initially place a request for a currently active channel and power control information (e.g., an active bearer channel information and a power control setpoint in peer to peer communications over an LTE X2 link) from base station 502. Base station 504 may then instruct locally served user equipment 508 to measure a received power over the active channel of base station 502. The user equipment 508 may then perform the requested measurement procedure and reports the result to the initiating base station 504. Base station 504 can then calculates and records radio channel isolation for communications associated with base station 502 in a radio channel isolation table.

This isolation measurement, along with similar isolation measurements from other neighboring cells, may be used to provide for dynamic optimization and allocation of shared radio resources (e.g., by determining optimal dynamic channel reuse within a region of a cellular network). In accordance with other embodiments of the invention, additional methods of determining suitable downlink power measurement may include monitoring neighbor node common control channels, dedicating transient use of bearer channels for "isolation measurement probes", and utilizing suitably equipped access nodes with downlink receiver capabilities to monitor neighbor cell received power while muting transmitter functionality.

Figure 6:
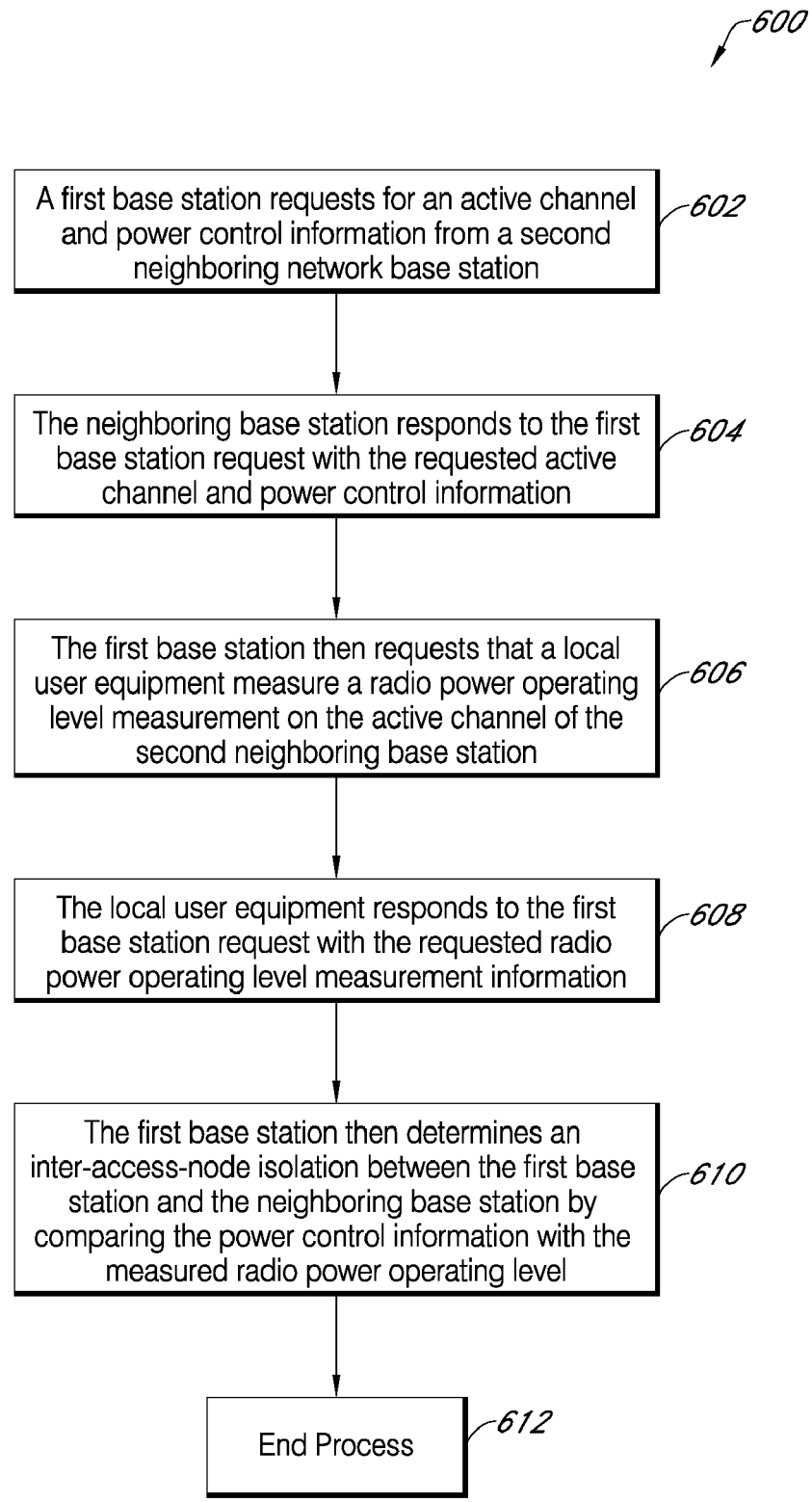
FIG. 6 illustrates a flow diagram depicting radio channel isolation determinations made by utilizing regional user equipment measurements of radio channel operating levels, in accordance with an embodiment of the present invention.

FIG. 6 illustrates a flow diagram 600 depicting radio channel isolation determinations made by utilizing regional user equipment measurements of radio channel operating levels, in accordance with an embodiment of the present invention. It should be understood that this process 600 could be executed using one or more computer-executable programs stored on one or more computer-readable media located on any of the network computing system's 100 base stations 106a-c, 118, 120, and 122, controller devices 110, 112 and 114, or collaboratively on any of the network's user equipment 124, 126a-c, 128, 130, and 132 of FIG. 1. At block 602, a first base station requests for an active channel and power control information from a second neighboring network base station. Next at block 604, the neighboring base station responds to the first base station's request with the requested active channel and power control information. Subsequently at block 606, the first base station requests that a local user equipment measure a radio power operating level measurement on the active channel of the second neighboring base station. Next at block 608, the local user equipment responds to the first base station request with the requested radio power operating level measurement information. Then, at block 610, the first base station then determines an inter-access-node isolation between the first base station and the neighboring base station by comparing the power control information with the measured radio power operating level. Subsequently the process ends at block 612.

Figure 7:
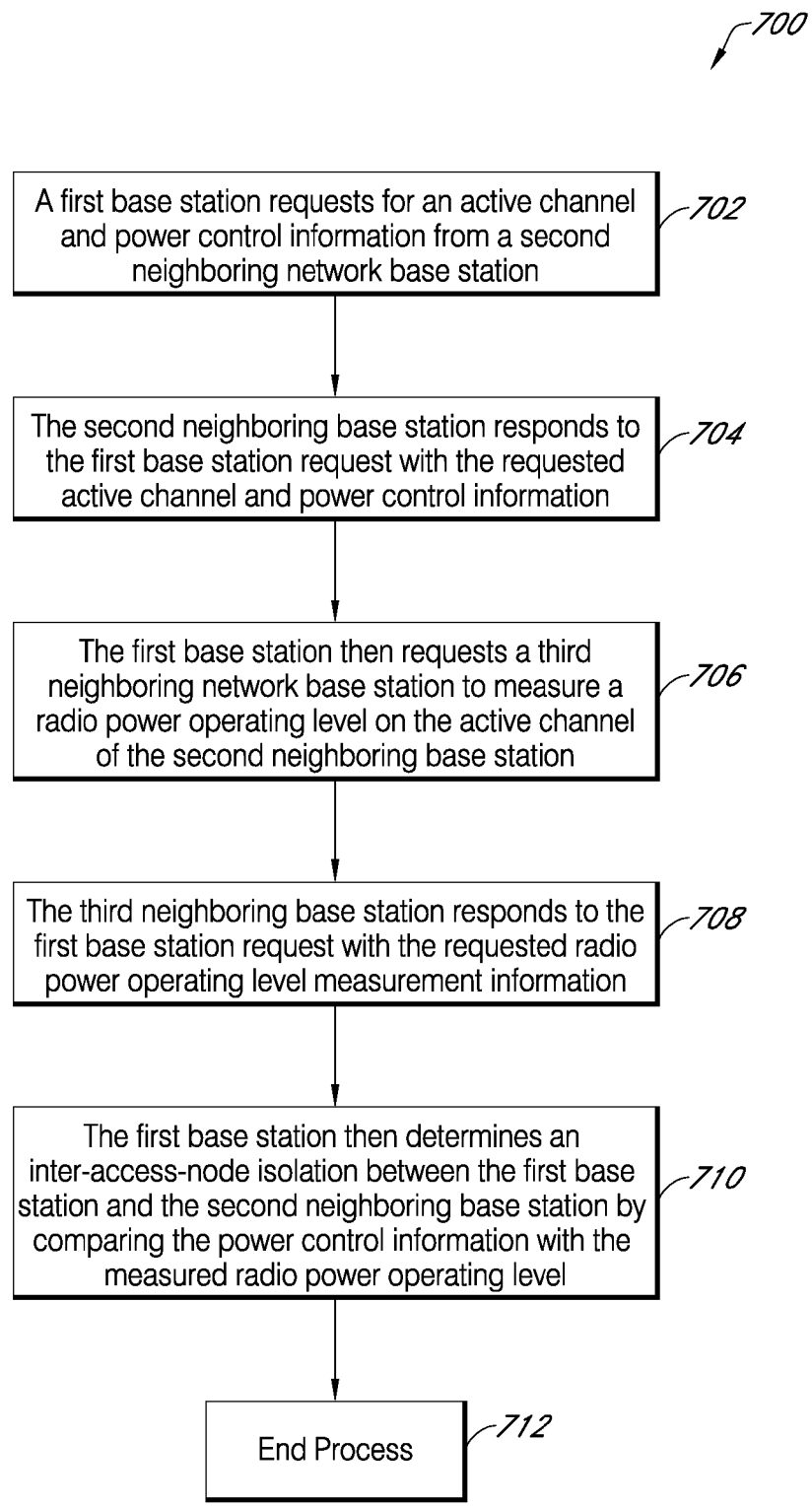
FIG. 7 illustrates a flow diagram depicting radio channel isolation determinations made by utilizing neighbor base station measurement of radio channel operating levels, in accordance with an embodiment of the present invention.

FIG. 7 illustrates a flow diagram 700 depicting radio channel isolation determinations made by utilizing neighbor base station measurement of radio channel operating levels, in accordance with an embodiment of the present invention. It should be understood that this process 700 could be executed using one or more computer-executable programs stored on one or more computer-readable media located on any of the network computing system's 100 base stations 106a-c, 118, 120, and 122, controller devices 110, 112 and 114, or collaboratively on any of the network's user equipment 124, 126a-c, 128, 130, and 132 of FIG. 1. At block 702, a first base station requests for an active channel and power control information from a second neighboring network base station. Next at block 704, the neighboring base station responds to the first base station's request with the requested active channel and power control information. Subsequently at block 706, the first base station then requests a third neighboring network base station to measure a radio power operating level on the active channel of the second neighboring base station. Next at block 708, the third neighboring base station responds to the first base station request with the requested radio power operating level measurement information. Then, at block 710, the first base station then determines an inter-access-node isolation between the first base station and the neighboring base station by comparing the power control information with the measured radio power operating level. Subsequently the process ends at block 712.

Figure 8:
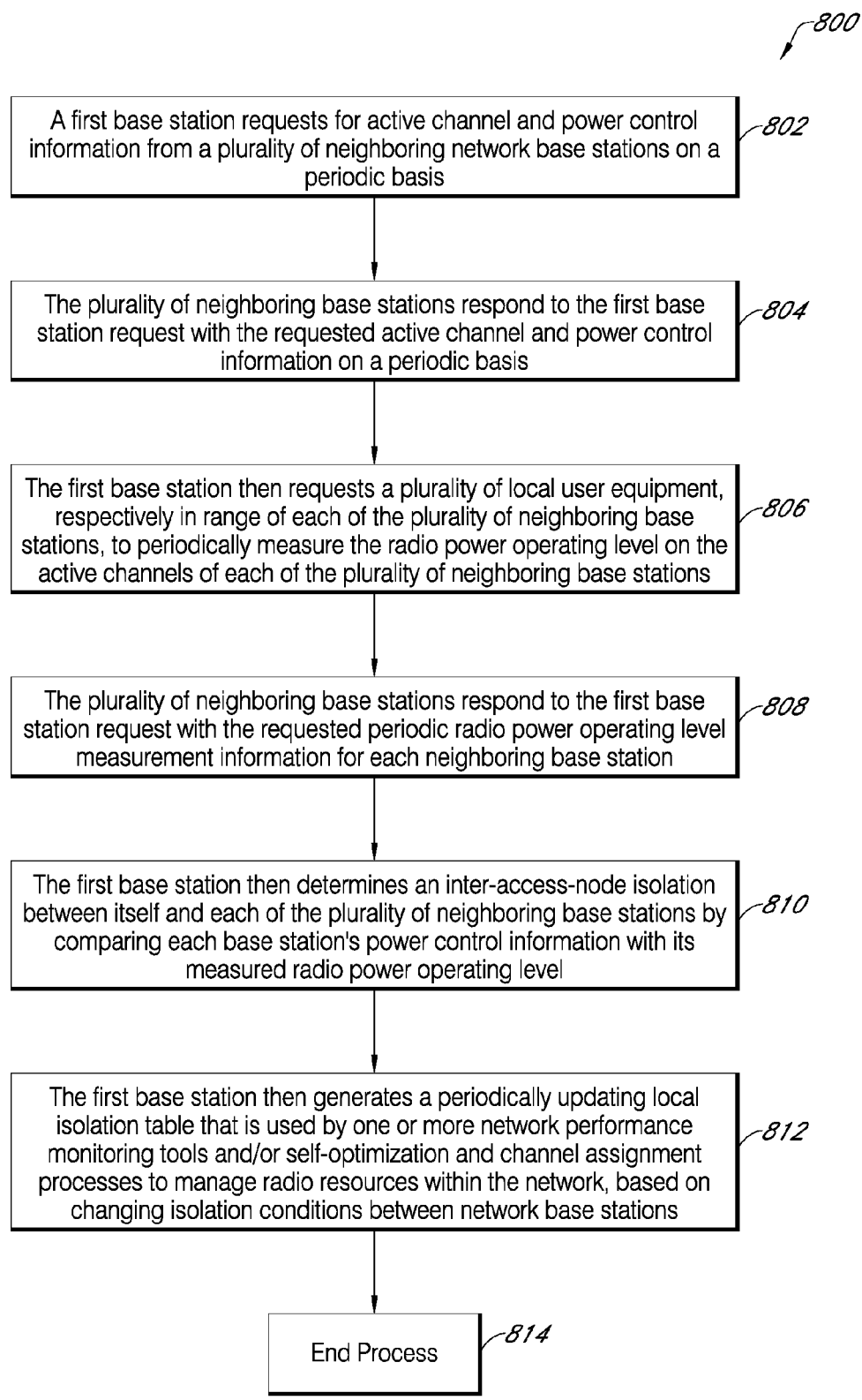
FIG. 8 illustrates a flow diagram depicting radio channel isolation determinations made by utilizing a plurality of regional user equipment measurements of radio channel operating levels, in accordance with an embodiment of the present invention.

FIG. 8 illustrates a flow diagram 800 depicting radio channel isolation determinations made by utilizing a plurality of regional user equipment measurements of radio channel operating levels, in accordance with an embodiment of the present invention. It should be understood that this process 800 could be executed using one or more computer-executable programs stored on one or more computer-readable media located on any of the network computing system's 100 base stations 106a-c, 118, 120, and 122, controller devices 110, 112 and 114, or collaboratively on any of the network's user equipment 124, 126a-c, 128, 130, and 132 of FIG. 1. At block 802, a first base station requests for an active channel and power control information from a plurality of neighboring network base stations. Next at block 804, the plurality of neighboring base stations respond to the first base station's request with the requested active channel and power control information on a periodic basis. Subsequently, at block 806, the first base station then requests a plurality of location user equipment, respectively in range of each of the plurality of neighboring base stations, to periodically measure the radio power operating level on the active channels of each of the plurality of neighboring base stations. Next at block 808, the plurality of neighboring base stations respond to the first base station request with the requested radio power operating level measurement information for each neighboring base station. Then, at block 810, the first base station then determines an inter-access-node isolation between itself and each of the plurality of neighboring base stations by comparing the power control information with its measured radio power operating levels. Next, at block 812 the first base station then generates a periodically updating local isolation table that is used by one or more network performance monitoring tools and/or self-optimization and channel assignment processes to manage radio resources within the network, based on changing isolation conditions between neighboring network base stations. Subsequently the process ends at block 812.

In an embodiment, an objective of the present invention is to make use of existing, deployed network resources, such as network base stations 300 and user equipment 200 (UEs served by the network base stations), to make frequent, real-time measurements of radio frequency isolation or effective path loss between neighboring network base stations. In this way, embodiments of the present invention can make use of fielded equipment in order to measure static and time-varying isolation characteristics between nearby neighboring base stations and then send this measurement information to automated radio resource controllers and/or base stations requesting this information. The network controllers and/or base stations may then process the measurements to facilitate efficient and dynamic distribution of radio resources such as bearer channel and transmit power settings for various network cells. By obtaining local estimates of network isolation contributors, such as building penetration losses, time varying multipath reflectors (e.g. time varying vehicular traffic patterns), seasonal foliage changes, snow, etc. network service providers can automatically account real world conditions that are presently very difficult to model and measure.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention is which an exclusive property or privilege is claimed are defined as follows:

1. A networked computing system for determining time-varying radio isolation characteristics associated with wireless network resources, the system comprising:
   a plurality of network base stations;
   at least one user equipment; and
   a data communications network facilitating data communications amongst all communicating devices of the networked computing system,
   wherein a radio frequency isolation between a first network base station and a second network base station is determined by taking measurements of a radio operating parameter associated with at least one interference source,
   wherein a regional network device located near the first network base station or the second network base station is configured to measure the radio operating parameter on a periodic basis,
   wherein the regional network device is further configured to transfer measurements of the radio operating parameter taken at different operating times to a radio communications controller, and
   wherein the radio communications controller is configured to allocate network communications resources to one or more user equipment or to designate radio operation levels for at least one network base station, based on a comparison of the received measurements of the radio operating parameter to known broadcast levels of the radio operating parameter.

2. The networked computing system of claim 1, wherein the regional network device is a network base station or a user equipment of the data communications network.

3. The networked computing system of claim 1, wherein the radio frequency isolation between the first network base station and the second network base station is affected by a time-varying isolation source selectable from the group consisting of: vehicular traffic patterns, seasonal environmental isolation sources, predictable adverse atmospheric conditions, and radio access node power control in response to network load patterns.

4. The networked computing system of claim 1, wherein the radio operating parameter measurements are affected by time-varying and static isolation sources geographically positioned between the first network base station and the second network base station within the data communications network.

5. A non-transitory computer-readable medium encoded with computer-executable instructions for determining time-varying radio isolation characteristics associated with wireless network resources, which when executed, performs the method comprising:
   measuring a radio operating parameter that is associated with at least one interference source within a data communications network; and determining a radio frequency isolation between a first network base station and a second network base station of the data communications network, based on the measurements of the radio operating parameter;

measuring the radio operating parameter on a periodic basis;

transferring measurements of the radio operating parameter taken at different operating times to a radio communications controller; and allocating network communications resources to one or more user equipment or designating radio operation levels for at least one network base station, based on a comparison of the received measurements of the radio operating parameter to known broadcast levels of the radio operating parameter.

6. The computer-readable medium of claim 5, wherein the radio frequency isolation between the first network base station and the second network base station is affected by a time-varying isolation source selectable from the group consisting of: vehicular traffic patterns, seasonal environmental isolation sources, predictable adverse atmospheric conditions, and radio access node power control in response to network load patterns.

7. The computer-readable medium of claim 5, wherein the radio operating parameter measurements are affected by time-varying and static isolation sources geographically positioned between the first network base station and the second network base station within the data communications network.

8. The non-transitory computer-readable medium of claim 5, wherein the measuring-the-radio-operating-parameter step is performed by a regional network device located near the first network base station or the second network base station.

9. The non-transitory computer-readable medium of claim 8, wherein the regional network device is either a network base station or a user equipment of the data communications network.

10. A computer-implemented method for determining time-varying radio isolation characteristics associated with wireless network resources, the method comprising:

measuring a radio operating parameter that is associated with at least one interference source within a data communications network;

determining a radio frequency isolation between a first network base station and a second network base station of the data communications network, based on the measurements of the radio operating parameter;

measuring the radio operating parameter on a periodic basis;

transferring measurements of the radio operating parameter taken at different operating times to a radio communications controller; and allocating network communications resources to one or more user equipment or designating radio operation levels for at least one network base station, based on a comparison of the received measurements of the radio operating parameter to known broadcast levels of the radio operating parameter.

11. The computer-implemented method of claim 10, wherein the radio frequency isolation between the first network base station and the second network base station is affected by a time-varying isolation source selectable from the group consisting of: vehicular traffic patterns, seasonal environmental interference sources, predictable adverse atmospheric conditions, and radio access node power control in response to network load patterns.

12. The computer-implemented method claim 10, wherein the measuring-the-radio-operating-parameter step is performed by a regional network device located near the first network base station or the second network base station.

13. The computer-implemented method of claim 12, wherein the regional network device is either a network base station or a user equipment of the data communications network.

* * * * *